Dec. 19, 1950     E. C. TWIST     2,534,639
FISH PLUG
Filed May 10, 1949     2 Sheets-Sheet 1
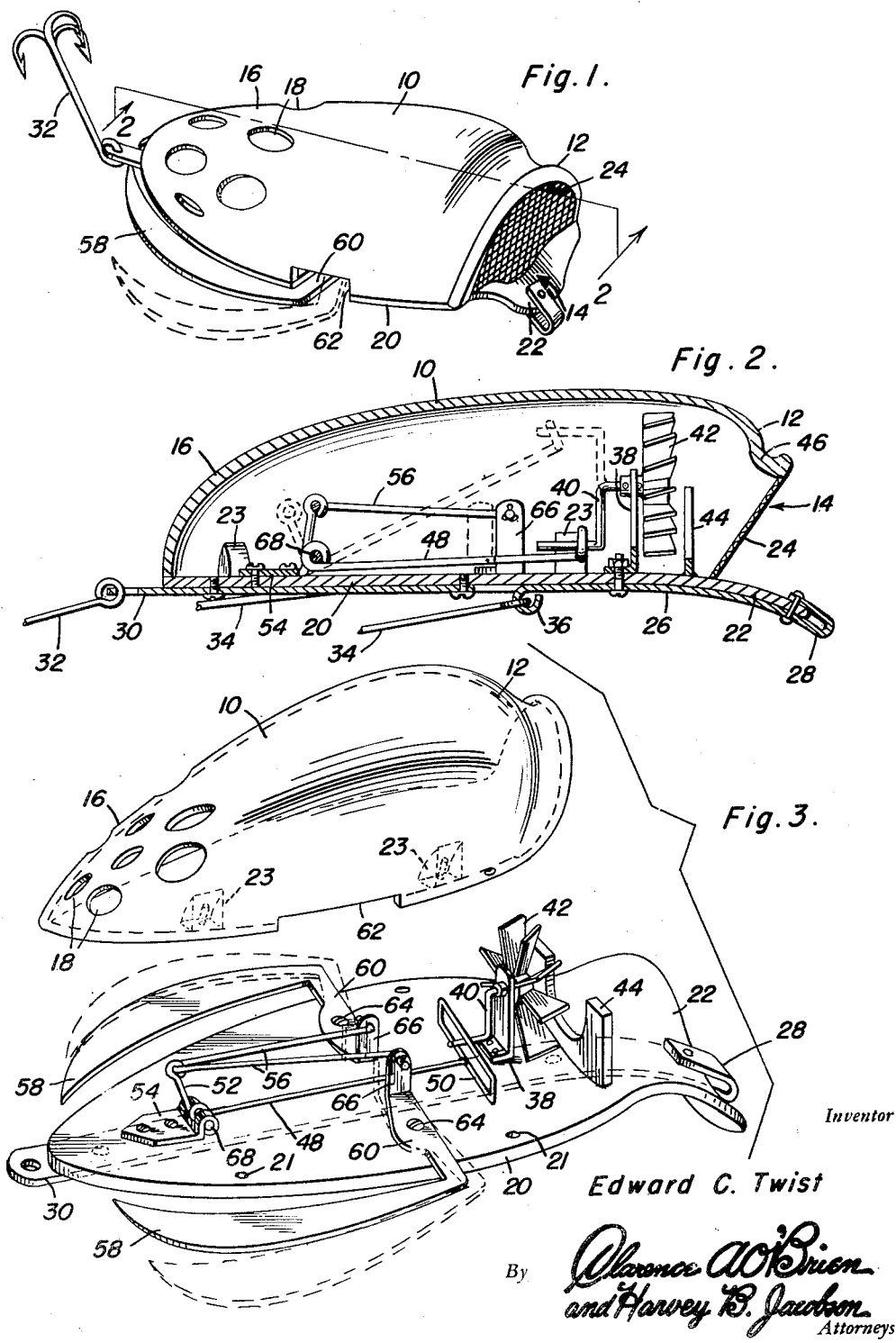
Inventor
Edward C. Twist

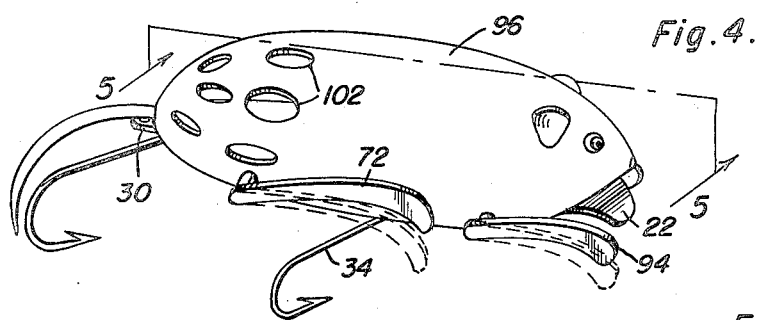
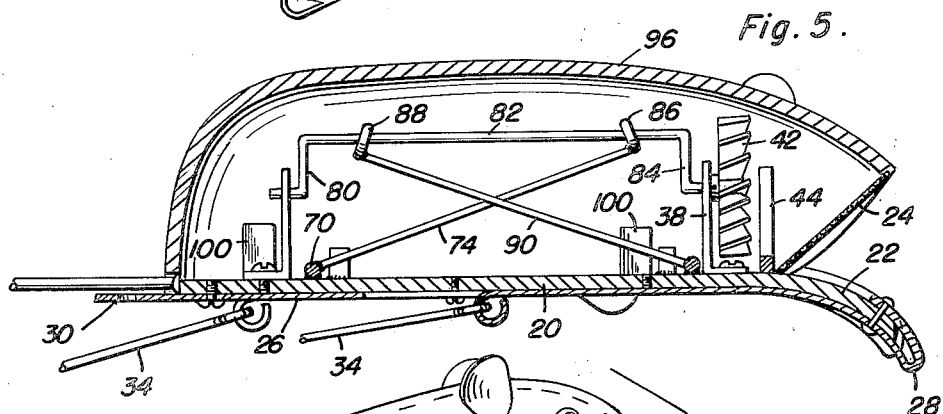
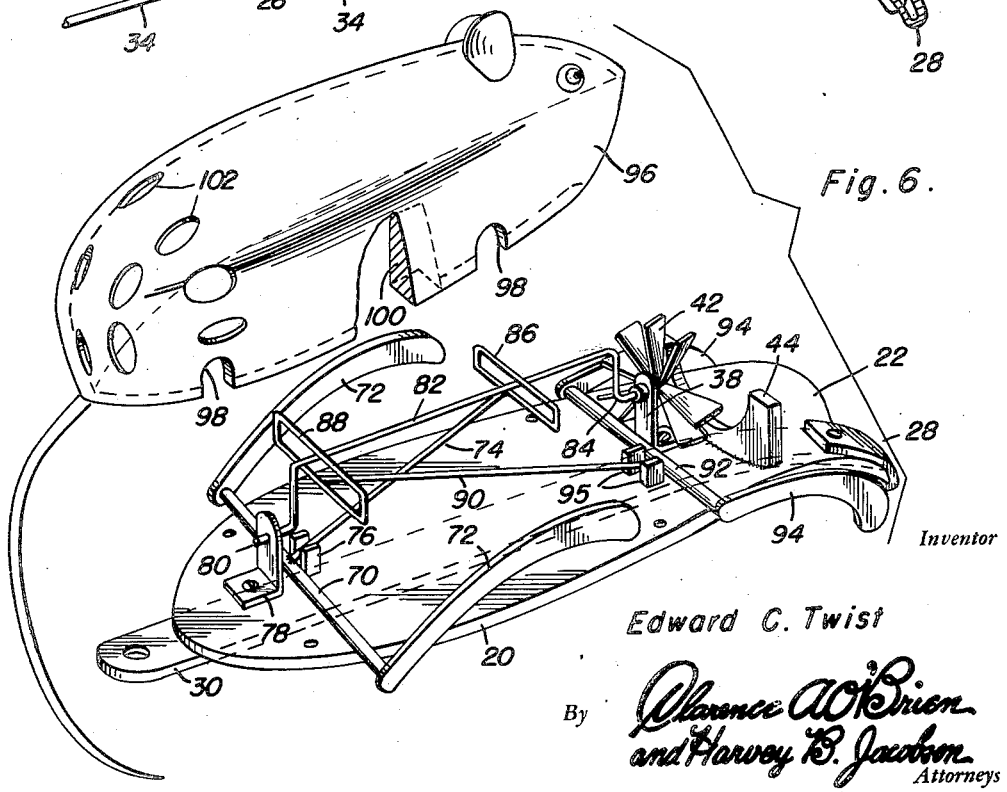

Patented Dec. 19, 1950

2,534,639

UNITED STATES PATENT OFFICE 2,534,639

FISH PLUG

Edward C. Twist, Tulsa, Okla., assignor of fifty per cent to Albert V. Fish, Tulsa, Okla.

Application May 10, 1949, Serial No. 92,369

8 Claims. (Cl. 43—26.2)

This invention relates generally to fish plugs and more particularly to a fish plug or lure having a water motor operatively connected with certain body members so that these body members are activated relative to the main body portion when the lure is drawn through the water.

A primary object of this invention is to provide a fish lure in which a basic structure can be adapted in order to achieve many different types of lures having different configurations and different numbers and types of body members which are motivated.

Another object of this invention is to provide a fish lure which can be used successfully in waters which are not clear, the device including means to achieve a sufficient flow of water through the lure in order to motivate the water wheel, while preventing entrance of weeds and other matter into the lure.

Still another object of this invention is to provide a lure in which the basic construction can be altered so that body members may be motivated to move laterally or vertically of the body.

Still another object of this invention is to provide means whereby a choke action is achieved in the water channel through the lure, this feature resulting in more positive driving of the water wheel.

And a last object to be mentioned specifically is to provide a fish lure which is relatively inexpensive and practicable to manufacture, which is simple and convenient to operate, and which will give generally efficient and durable service.

With these objects definitely in view, this invention resides in certain novel features of construction, combination and arrangement of elements and portions as will hereinafter be described in detail in the specification, particularly pointed out in the appended claims, and illustrated in the accompanying drawings which form a material part of this application, and in which:

Figure 1 is a three dimensional view of the assembled fish lure;

Figure 2 is a vertical longitudinal sectional view, taken substantially upon the line 2—2 in Figure 1;

Figure 3 is a grouped view, in perspective, of the lure with the hooks removed;

Figure 4 is a perspective view of a modified form of this invention, in which front and rear body members are motivated;

Figure 5 is a longitudinal vertical sectional view taken substantially upon the line 5—5 in Figure 4; and Figure 6 is an exploded view of the modified form shown in Figures 4 and 5, the hooks being removed.

Similar characters of reference designate similar or identical elements and portions throughout the specification and throughout the different views in the drawings.

Referring now to the drawings in detail, this invention relates to improvements in a fish lure having a body portion 10 in which the portion 12 will be considered the front end portion and this front end portion has an opening 14. The fish lure has a rear end portion 16 with a plurality of openings 18 therein, and this body 10 is hollow and ordinarily constructed of plastic material and brightly colored and configurated to represent some creature whose nature is such as to attract fish. The body represented at 10 is designed to represent generally a giant water bug, but it will be noticed that the base plate 20 is substantially flat throughout the major portion of its length, this sacrifice as to proper configuration being made in the interest of providing a suitable support for the mechanical elements of the invention to be described hereinafter.

The base plate 20 is secured by screws, thought to be unnecessary to be represented, which are inserted through apertures 21 in the base plate 20 and into suitably threaded thickened wall portions 23 in the body 10. The base plate has a forwardly and downwardly extending portion 22 which will be hereinafter referred to as the water scoop, the shape of which will be determined by considerations of mechanical expediency, the function of which will, however, in all cases be to direct water into the opening 14 as the lure is drawn forwardly through the water. A screen 24 covers the opening 14, this screen being marginally secured, preferably by frictional contact only, so that the screen can be easily removed when necessary.

A hook attachment plate 26 comprises an elongated strap extending longitudinally of the base plate and secured exteriorly thereto by any suitable means, and the forward end of the hook attachment plate is formed into a hook 28, this hook 28 serving as a line attachment member for the lure. The rear end of the hook attachment plate 26 extends beyond the rear end portion 16 of the body and has secured thereto a fish hook 32, in the embodiment of this invention illustrated in Figures 1, 2 and 3. Other fish hooks, such as those indicated at 34 will be secured according to the desire of the manufacturer, by such means as the eye represented at 36, and it should be understood that no particular type of hook or means of attachment of hooks are necessarily required in carrying this invention into practice, the versatility of the device in connection with such matters being a feature of this invention.

A bracket 38 is rigidly secured to the inside surface of the base plate 20 in the front end portion 12 of the body and this bracket includes a bearing to support a crank shaft 40. This crank shaft has rigidly mounted thereon a water wheel 42, and it should be noted that the crank shaft is disposed longitudinally of the body member 10. A choke 44, comprising an upright plate with a substantially semi-circular recess therein is rigidly mounted on the base plate 20 in front of the water wheel 42, the semi-circular recess being arranged axially of the water wheel 42, and this choke 44 may be considered as an element cooperating with a throat portion 46 in the body 10, in embodiments of this invention allowing the provision of such a throat portion.

A rocker bar 48 is operatively connected with the crank shaft 40 by means of a transversely elongated loop 50 on the front end of this rocker bar and adapted to continuously engage a crank portion of said crank shaft 40. The other end of the rocker bar 48 has an integral bell crank 52, and this other end is pivoted on a bracket 54 rigidly secured to the base plate 20, adjacent the rear end thereof. A pair of inflexible links 56 are used to connect the bell crank 52 with the body members 58 which are to be motivated. These body members 58 have shank portions 60 extending through apertures 62 provided in the sides of the body 10, and the shank portions 60 are pivoted as indicated at 64 on the base plate 20. The inner ends of the shank portions 60 may be upwardly turned as indicated at 66 and are pivotally connected to the forward ends of the inflexible links 56.

In the embodiment represented in Figures 1, 2 and 3, the pivot pin 68 is used to mount the bell crank portion 52 of the rocker bar 48. However, in the embodiment of this invention illustrated in Figures 4, 5 and 6, the corresponding member 70 is laterally extended for direct and rigid connection to rear leg members 72, the pin 70 being rigidly secured to the corresponding rocker bar 74. It will be noted in this embodiment of the invention that a pair of upstanding bosses 76, integral with the base plate 20, serve as guides for the rear end portion of the rocker bar 74 and the pin 70, the bracket 78 cooperating with the bosses 76 to hold the pin 70 in place while allowing pivotal movement thereof. A rear crank end portion 80 of a modified crank shaft 82 supplements the crank portion 84 corresponding to the crank shaft described hereinbefore, while the loop 86 and the second loop 88 are both actuated by this modified crank shaft 82 in a manner which will be obvious from an inspection of the figures. A second rocker arm 90 is rigidly secured to a second transverse pin 92 which is terminally connected to front leg portions 94, and another pair of bosses 95 on the base plate 20 serve as retaining members for this second pin 92 along with the bracket 38 which is unmodified in this embodiment.

In this embodiment, the body 96 may take the form of a mouse and laterally disposed apertures 98 will be provided in the lower edge portions of the body 96 to accommodate intermediate portions of the pins 70 and 92, in a manner similar to the manner in which the apertures 62 accommodated the shank portions 60 in the first described embodiment.

Thickened wall portions 100 correspond in structure and function with the thickened wall portions 23 already described and the apertures 102 will serve as exit ports for water entering through a screen 24 of a character similar to the screen already described and positioned at the front end of the body.

The operation of this invention will be clearly understood from a consideration of the foregoing description of the mechanical details thereof, taken in connection with the drawings and with the above recited objects. Further description would, therefore, appear to be unnecessary.

Having described the invention, what is claimed as new is:

1. A fish lure comprising an elongated hollow body having a front end portion, and a rear end portion, openings in the front and rear end portions, a crank shaft having a water wheel thereon operatively mounted in the body between said openings, a rocker bar pivoted on said body and operatively connected with said crank shaft, and body members pivoted on said body and operatively connected with said rocker bar.

2. A fish lure comprising an elongated hollow body having a front end portion, and a rear end portion, openings in the front and rear end portions, a crank shaft having a water wheel thereon operatively mounted in the body between said openings, a rocker bar pivoted on said body and operatively connected with said crank shaft, body members pivoted on said body, said rocker bar having an elongated loop at one end to engage said crank shaft and including an integral bell crank at the other end, and inflexible links terminally and pivotally connected to and between said bell crank and said body members.

3. A fish lure comprising an elongated hollow body having a front end portion, and a rear end portion, openings in the front and rear end portions, a crank shaft having a water wheel thereon operatively mounted in the body between said openings, a rocker bar pivoted on said body and operatively connected with said crank shaft, body members pivoted on said body, said rocker bar having an elongated loop at one end to engage said crank shaft and including an integral bell crank at the other end, and inflexible links terminally and pivotally connected to and between said bell crank and said body members, said body members having shanks mounted on pivot pins having their axes normal to the axis of the bell crank and normal to the longitudinal axis of the body.

4. A fish lure comprising an elongated hollow body having a front end portion, a rear end portion and a base plate, openings in the front end and rear end portions, body members pivoted on said base plate, a water wheel operatively mounted on said base plate between said openings and operatively connected to said body members, and means to direct the main flow of water through the body against said wheel.

5. A fish lure comprising an elongated hollow body having a front end portion, a rear end portion and a base plate, openings in the front end and rear end portions, body members pivoted on said base plate, a water wheel operatively mounted on said base plate between said openings and operatively connected to said body members, and a choke rigidly mounted between the opening in the front end portion and the water wheel.

6. A fish lure comprising an elongated hollow body having a front end portion, a rear end portion and a base plate, openings in the front end and rear end portions, body members pivoted on said base plate, a water wheel operatively mounted on said base plate between said openings and operatively connected to said body members, a choke rigidly mounted between the opening in the front end portion and the water wheel, and a water scoop integral with said base plate and extending in front of said opening in the front end portion.

7. A fish lure comprising an elongated hollow body having a front end portion, a rear end portion and a base plate, openings in the front end and rear end portions, body members pivoted on said base plate, a water wheel operatively mounted on said base plate between said openings and operatively connected to said body members, a choke rigidly mounted between the opening in the front end portion and the water wheel, a water scoop integral with said base plate and extending in front of said opening in the front end portion, and a screen to cover said opening in the front end portion.

8. A fish lure comprising an elongated hollow body having a front end portion, a rear end portion and a base plate, openings in the front end and rear end portions, body members pivoted on said base plate, a water wheel operatively mounted on said base plate between said openings and operatively connected to said body members, a choke rigidly mounted between the opening in the front end portion and the water wheel a water scoop integral with said base plate and extending in front of said opening in the front end portion, and a hook attachment plate extending longitudinally of and secured to said base plate and having a hook-shaped front end portion to hook over the front end of said scoop, said hook-shaped front end portion comprising attachment means for a line.

EDWARD C. TWIST.

REFERENCES CITED

The following references are of record in the file of this patent:

UNITED STATES PATENTS

| Number | Name | Date |
|---|---|---|
| 1,390,601 | Caldwell | Sept. 13, 1921 |
| 1,628,796 | Mayo | May 17, 1927 |
| 1,708,825 | Barclay | Apr. 9, 1929 |
| 2,027,069 | Sorenson | Jan. 7, 1936 |
| 2,229,175 | Johnson | Jan. 21, 1941 |
| 2,378,370 | Van Buren | June 12, 1945 |
| 2,448,523 | Fibiger | Sept. 7, 1948 |
| 2,450,253 | Parnell | Sept. 28, 1948 |

FOREIGN PATENTS

| Number | Country | Date |
|---|---|---|
| 128,244 | Germany | July 11, 1901 |